(12) United States Patent
Maguire et al.

(10) Patent No.: US 8,679,662 B2
(45) Date of Patent: Mar. 25, 2014

(54) BATTERY ASSEMBLY WITH GAS DISCHARGE MECHANISM

(75) Inventors: Patrick Daniel Maguire, Ann Arbor, MI (US); Sarav Paramasivam, South Lyon, MI (US); Hari Addanki, Novi, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 556 days.

(21) Appl. No.: 12/983,941

(22) Filed: Jan. 4, 2011

(65) Prior Publication Data

US 2012/0171533 A1 Jul. 5, 2012

(51) Int. Cl.
  *H01M 2/12* (2006.01)
  *H01M 2/10* (2006.01)
(52) U.S. Cl.
  USPC .............. 429/82; 429/72; 180/68.5; 320/107; 320/110; 320/112; 320/124; 320/147
(58) Field of Classification Search
  USPC .............. 429/72, 82; 320/107, 110, 112, 124, 320/147; 180/68.5
  See application file for complete search history.

(56) References Cited

U.S. PATENT DOCUMENTS

| 3,877,991 | A | 4/1975 | Fujikawa |
| 4,682,751 | A | 7/1987 | Tamas |
| 6,278,259 | B1 * | 8/2001 | Kimoto et al. ................. 320/147 |
| 7,045,236 | B1 * | 5/2006 | Andrew et al. .................. 429/83 |
| 2005/0055889 | A1 * | 3/2005 | Thaler .............................. 52/58 |
| 2005/0153199 | A1 | 7/2005 | Yagi et al. |
| 2008/0085445 | A1 * | 4/2008 | Marukawa et al. ............. 429/82 |

FOREIGN PATENT DOCUMENTS

| JP | 03295722 | * 12/1991 | ............ B60K 15/03 |
| JP | 2002186101 | A | 6/2002 |

* cited by examiner

*Primary Examiner* — Carlos Barcena
*Assistant Examiner* — Michael Dignan
(74) *Attorney, Agent, or Firm* — David B. Kelley; Brooks Kushman P.C.

(57) ABSTRACT

A battery gas discharge system is provided having a floorpan with an outlet and a fastener aperture. The outlet and the fastener aperture are laterally spaced from each other. The system also includes a battery module with a base for resting upon the floorpan. An attachment aperture and a vent aperture are formed through the base. The attachment aperture and the vent aperture are laterally spaced from each other. A gas discharge mechanism defines a passageway for gas discharge between the battery module and the vent aperture. The gas discharge mechanism includes a vent port that is coupled to the vent aperture and sized for receiving discharged gas. The vent port is adapted for mating with and forming a seal about the outlet by securing the base to the floorpan during assembly.

20 Claims, 5 Drawing Sheets

BATTERY ASSEMBLY WITH GAS DISCHARGE MECHANISM

BACKGROUND

1. Technical Field

One or more embodiments generally relate to a battery assembly and battery gas discharge systems for mounting in a vehicle.

2. Background Art

Vehicles utilize batteries for storing electrical energy. The batteries may include electrolytes that should be prevented from leaking into a passenger compartment of the vehicle. Battery venting of gas may occur when a battery is either overcharged or overheated.

Batteries are often mounted under a hood of the vehicle in an engine compartment. An interior portion of the vehicle, including the passenger compartment and trunk, is sealed from the engine compartment to prevent gas from venting into the vehicle. However, high-voltage ("HV") batteries for electric and hybrid electric vehicles are typically too large to be mounted in the engine compartment, and therefore are often mounted within the interior portion of the vehicle.

HV batteries that are mounted in the vehicle interior may include known battery gas discharge mechanisms for routing gas emitted by the battery to a body exterior.

One example of such a known battery discharge mechanism includes a battery assembly with a partially assembled gas discharge mechanism. The battery assembly is shipped to a vehicle assembly facility with a disconnected gas discharge hose. To assemble the battery to the vehicle; first the battery is mounted to the vehicle and then the gas discharge hose is connected to a body exterior.

SUMMARY

In at least one embodiment, a battery assembly is provided having a battery module with a base for resting upon an underlying surface. The base includes an attachment feature and a vent aperture formed through the base. The attachment feature is laterally spaced apart from the vent aperture. A vent port is coupled to the vent aperture and defines a passageway for gas discharge through the vent aperture. The vent port includes a seal disposed about the vent aperture. The seal is adapted for mating with and forming a seal about an outlet formed in an underlying surface by securing the base to the underlying surface.

In another embodiment, a battery gas discharge system is provided for mounting in a vehicle. The system includes a body surface for retaining components within an interior of a vehicle. The body surface includes an outlet and a fastener aperture formed through the body surface. The outlet and fastener aperture are laterally spaced from each other. A battery module having a base for mounting to the body surface is also provided. The base includes an attachment aperture and a vent aperture formed through the base. The attachment aperture and the vent aperture are laterally spaced from each other. A gas discharge mechanism is coupled between the battery module and the vent aperture for defining a passageway for gas discharge. The gas discharge mechanism includes a vent tube and a vent port. The vent tube has a proximal end projecting into the battery module and a distal end opposite the proximal end. The vent port is coupled to the vent aperture and sized for receiving the distal end of the vent tube. The vent port includes a seal disposed about the vent aperture and adapted for mating with and forming a seal about the outlet by securing the base to the body surface during assembly.

In yet another embodiment, a battery assembly is provided having a battery module with a base. The base includes a vent aperture formed therethrough and an attachment laterally spaced from the vent aperture. A vent port is coupled to the vent aperture and includes a seal disposed thereabout and adapted for mating with an outlet adjacent the base.

DETAILED DESCRIPTION

As required, detailed embodiments of the present invention are disclosed herein; however, it is to be understood that the disclosed embodiments are merely exemplary of the invention that may be embodied in various and alternative forms. The figures are not necessarily to scale; some features may be exaggerated or minimized to show details of particular components. Therefore, specific structural and functional details disclosed herein are not to be interpreted as limiting, but merely as a representative basis for the claims, and/or as a representative basis for teaching one skilled in the art to variously employ the present invention.

Known battery assemblies having gas discharge mechanisms that are installed after the battery assembly is mounted to a vehicle add excess cost and labor to the assembly process. After the battery assembly is mounted to the vehicle, an additional step of attaching a tube to an outlet is required. Further, additional quality inspections (e.g., visual, pressure or torque measurements) may be required to confirm that the tube is properly secured. A vehicle system is provided which eliminates this excess assembly step by integrating the gas discharge mechanism to the battery assembly, thereby reducing the overall cost of the system.

Figure 1:
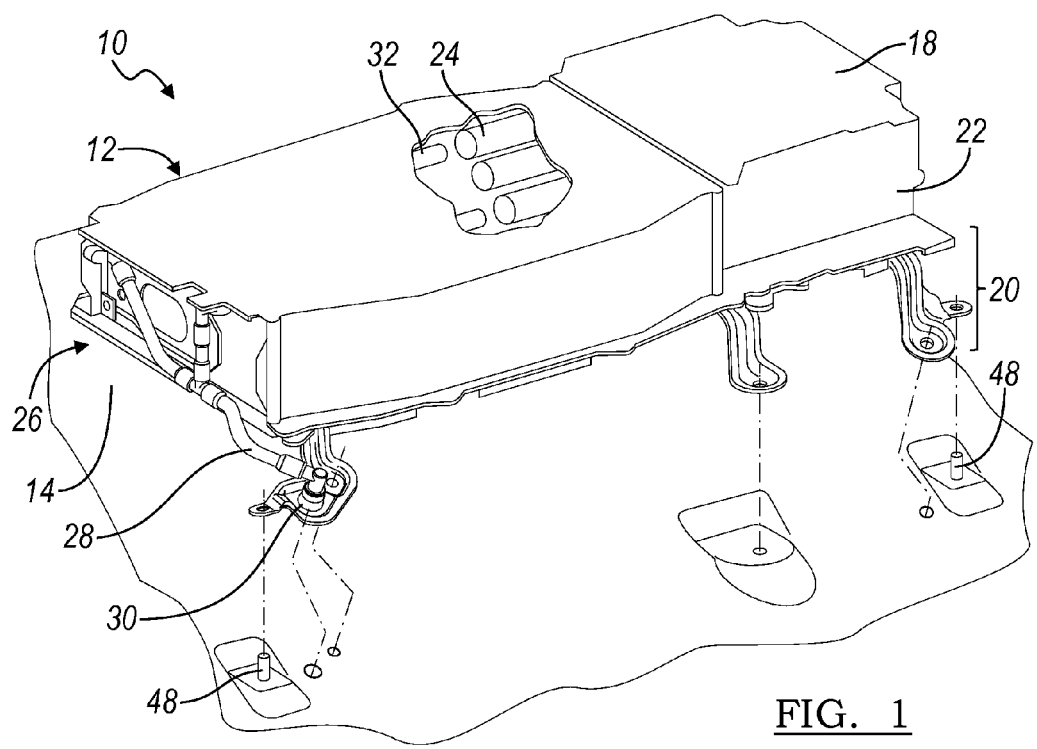
FIG. 1 is a perspective view of a battery gas discharge system according to at least one embodiment, illustrated in a detached position.

With reference to FIG. 1, a battery gas discharge system is illustrated in accordance with an embodiment and is generally referenced by numeral 10. The system 10 includes a battery assembly 12 and a body surface such as a floorpan 14 that are coupled to each other during the assembly of a vehicle (not shown).

The battery assembly 12 includes a battery module 18 with a base 20. The base 20 supports the battery module 18 and includes mounting structure for rigidly attaching the battery assembly 12 to the floorpan 14. The battery assembly 12 also includes a case 22 that extends from the base 20 to define an enclosed cavity. A plurality of cells 24 are located within the case 22. The cells 24 are adapted to store electrical energy. The cells 24 may be formed of a variety of known battery types (e.g., Lithium-Ion, Nickel-Metal-Hydride or Lead-Acid). The cells 24 include electrolytes that should be prevented from leaking or venting into a passenger compartment of the vehicle.

The battery assembly 12 includes a gas discharge mechanism 26 for discharging gas from an interior portion of the battery module 18 to the outside of the vehicle. The gas discharge mechanism 26 includes a vent tube 28 and a vent port 30 that are connected to each other to define a passageway for gas discharge. The vent tube 28 includes a proximal end 32 that extends into the case 22 to a location that is proximate to the cells 24. The proximal end 32 receives any gas that may vent from the cells 24. Cells 24 may vent when they are overcharged, overheated or subjected to other types of abuse or damage (e.g., a short circuit).

Figure 2:
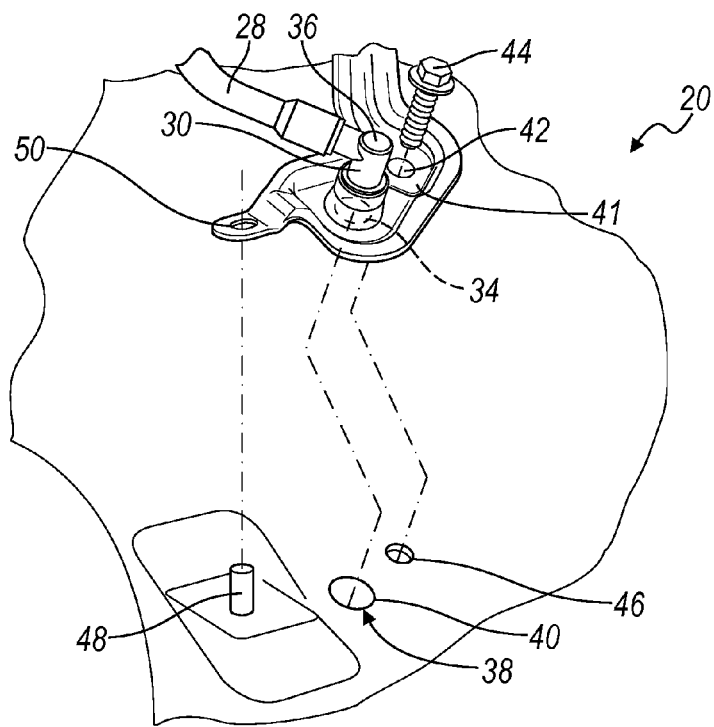
FIG. 2 is an enlarged view of a base of the system of FIG. 1.

Referring to FIGS. 1 and 2, the vent port 30 couples the gas discharge mechanism 26 to the base 20. A vent aperture 34 is formed through the base 20. The vent port 30 attaches to the base 20 about the vent aperture 34. A distal end 36 of the vent tube 28 attaches to the vent port 30. The gas discharge mechanism 26 is secured to the battery assembly 12 prior to shipping to a vehicle assembly facility and does not require any additional installation when the assembly 12 is mounted to the vehicle.

The system 10 contemplates various configurations of the gas discharge mechanism 26 which depend on a specific vehicle application. The illustrated embodiment of the system 10 includes a single gas discharge mechanism 26, however other embodiments contemplate a battery assembly 12 with multiple gas discharge mechanisms 26. Additionally, the illustrated embodiment of the system 10 includes a vent tube 28 having two proximal ends 32 that are joined together outside of the battery module 18, however other embodiments contemplate a single proximal end 32 and more than two proximal ends 32.

The floorpan 14 provides support for components that are mounted within the vehicle 16. The floorpan 14 includes an outlet 38 separating a vehicle interior from a vehicle exterior. The outlet 38 includes a floorpan aperture 40 formed through the floorpan 14. The outlet 38 may also include a filter (not shown) that is disposed over the floorpan aperture 40 for limiting ingress of water and particles (e.g., rocks). The outlet 38 mates with the vent port 30 and facilitates gas discharge.

The system 10 includes an attachment feature 41 for rigidly attaching the battery assembly 12 to the floorpan 14. In one embodiment, an attachment aperture 42 is formed through the base 20 and sized for receiving a fastener 44. The attachment aperture 42 is formed adjacent to the vent aperture 34. A fastener aperture 46 is formed through the floorpan 14 and sized for receiving the fastener 44. The fastener aperture 46 is formed adjacent to the outlet 38. Other embodiments of the system 10 include alternative attachment features 41 such as: attaching studs to the floorpan 14 for engaging the base 20; and welding the base 20 to the floorpan 14.

The system 10 may include locating features for aligning the battery assembly 12 to the floorpan 14 during assembly. The battery assembly 12 is maneuvered above a desired mounting location, then lowered into position while using the locating features. The locating features may include pins 48 that are attached (e.g., welded) to and extend in a generally upright direction from the floorpan 14. Locator apertures 50 are formed through the base 20 and sized for receiving the pins 48. One of the pins 48 may be located adjacent to the outlet 38, and a corresponding locator aperture 50 is formed adjacent to the vent aperture 34. This pin 48 and locator aperture 50 alignment helps to align the vent port 30 with the floorpan aperture 40. Other embodiments of the system 10 include alternate locating features, such as pins extending from the battery assembly 12 to align with apertures in the floorpan 14.

Figure 3:
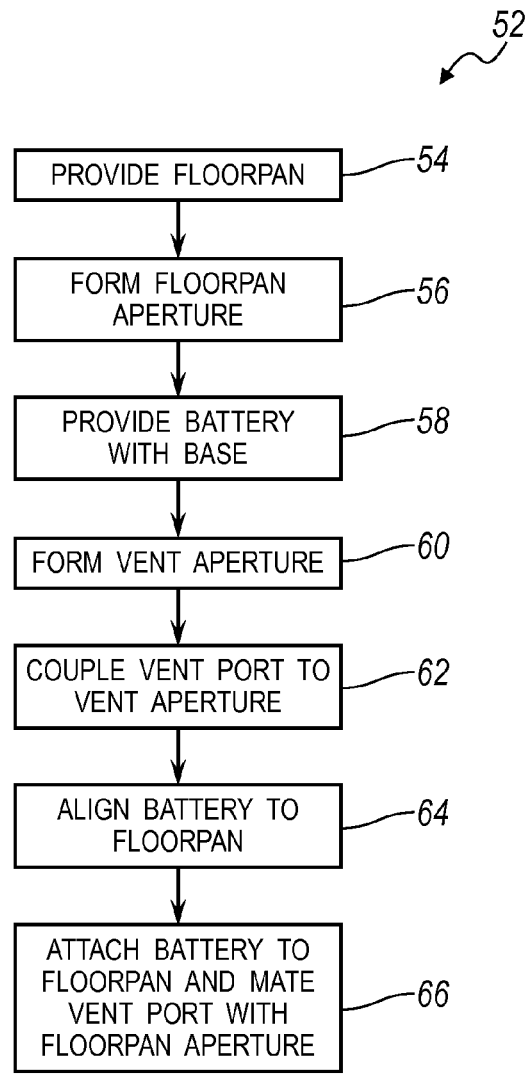
FIG. 3 is a method for mounting a battery assembly of the system of FIG. 1 to a vehicle.

With reference to FIGS. 1-3, a method 52 for mounting the battery assembly 12 to the floorpan 14 is provided. In step 54, the floorpan 14 is provided. In step 56 the floorpan aperture 40 is formed through the floorpan 14. In step 58, the battery assembly 12 having base 20 is provided. In step 60, the vent aperture 34 is formed through the base 20. In step 62, the vent port 30 is coupled to the base 20 about the vent aperture 34. In step 64, the battery assembly 12 is aligned with the floorpan 14. And in step 66 the battery assembly 12 is attached to the floorpan 14 such that the vent port 30 is simultaneously secured to the floorpan aperture 40, without any additional steps.

Figure 4:
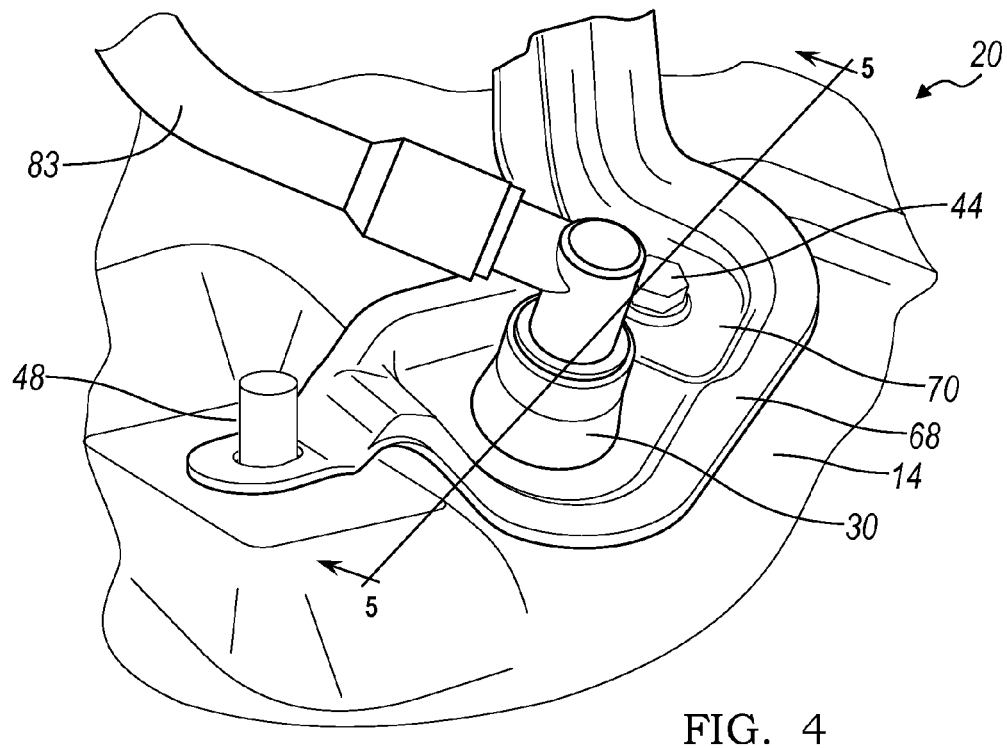
FIG. 4 is the base of FIG. 2, illustrated in an attached position.
Figure 5:
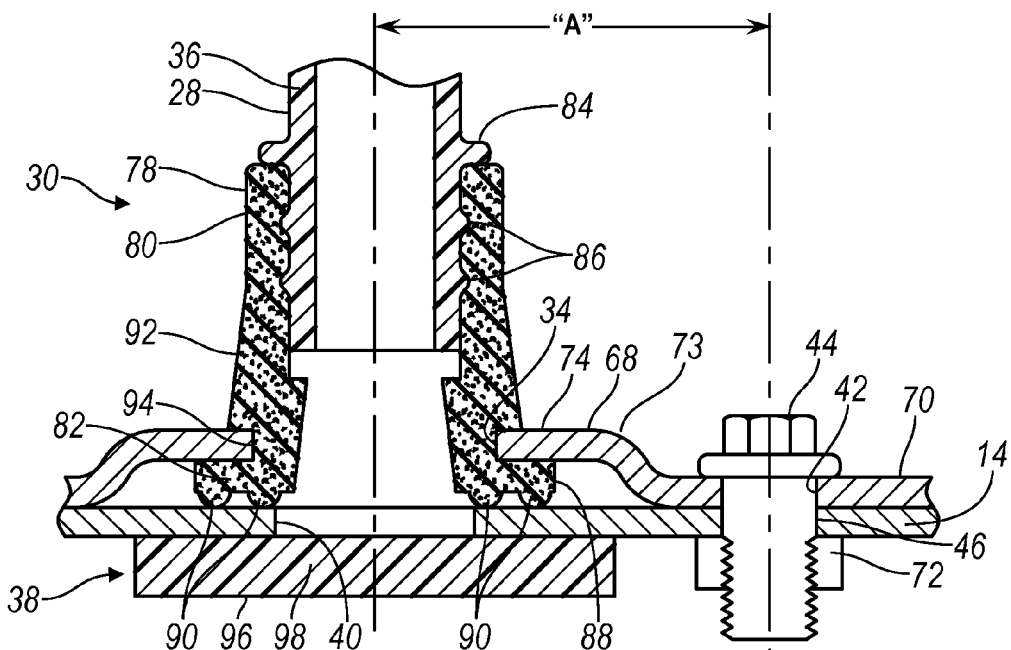
FIG. 5 is a cross-sectional view of the base of FIG. 4 taken along section line 5-5.

With reference to FIGS. 4 and 5, the base 20 includes a mounting bracket 68 for attaching the battery assembly 12 to the floorpan 14. The mounting bracket 68 includes a mounting flange 70 in contact with the floorpan 14. The attachment aperture 42 is formed through the mounting flange 70 and aligned with the fastener aperture 46 of the floorpan 14. A nut 72 may be attached to an underside of the floorpan 14 and axially aligned with the fastener aperture 46. The nut 72 engages the fastener 44 for retaining the battery assembly 12 to the floorpan 14.

The mounting bracket 68 also includes the vent aperture 34 for locating the vent port 30. A boss 73 projects from the mounting flange 70. The boss 73 forms a raised surface 74 that is spaced above the floorpan 14. The vent aperture 34 is formed through the raised surface 74 and is aligned with the floorpan aperture 40.

The lateral spacing between the attachment aperture 42 and the vent aperture 34 corresponds to the lateral spacing between the fastener aperture 46 and the floorpan aperture 40, and is generally referenced by "A". The lateral spacing "A" allows the vent port 30 to simultaneously mate with the outlet 38 by securing the mounting bracket 68 to the floorpan 14 about attachment aperture 42 and fastener aperture 46. No additional attachments of the gas discharge mechanism 26 are needed. In one embodiment the lateral spacing "A" is between two and four inches.

The vent port 30 includes a grommet 78 for coupling the gas discharge mechanism 26 to the outlet 38. The grommet 78 has a tubular shape and is formed of a resilient material. The grommet 78 includes an inlet 80 and a seal, such as a gasket 82. In one embodiment, the inlet 80 and the gasket 82 are integrally formed with the grommet 78. Other embodiments of the system 10 include a seal formed from a liquid applied seal.

The inlet 80 is formed at a first end of the grommet 78 and engages the vent tube 28. The inlet 80 extends from the vent aperture 34 and forms an inner cavity for receiving the distal end 36 of the vent tube 28. The distal end 36 of the vent tube 28 may be formed of a rigid polymer (e.g., polypropylene). The vent tube 28 may include a flexible hose 83 coupled between the distal end 36 and the battery module 18. A lip 84 extends radially outward from the distal end 36 and beyond an inner diameter of the inlet 80. The lip 84 limits the insertion depth of the distal end 36 into the grommet 78. The distal end 36 may also include interference rings 86 that extend radially outward beyond the inner diameter of the inlet 80, but not beyond the lip 84. The interference rings 86 engage and elastically deform the inner cavity of the inlet 80 and thereby increase a force required to remove the vent tube 28 from the vent port 30.

The gasket 82 engages the floorpan 14 for sealing the vent port 30 to the floorpan 14. The gasket 82 forms a flange 88.

The flange 88 extends radially outward between the raised surface 74 and the floorpan 14. The gasket 82 may include protrusions such as annular rings 90 that are formed around the vent port 30 and aligned with an axis of the grommet 78. The annular rings 30 extend transversely away from the flange 88 to engage and facilitate a seal with the floorpan 14. The thickness of the gasket 82 is greater than a height of the boss 73. Therefore the mounting bracket 68 compresses the gasket 82 during assembly. By compressing the gasket 82, the vent port 30 is sealed to the floorpan 14 about the outlet 38 for preventing any discharged gas from venting into the vehicle interior.

The raised surface 74 and the mounting flange 70 are each formed on planes that are generally parallel to each other. The mass of the battery assembly 12 may provide sufficient clamp load to compress the gasket 82. The battery assembly 12 may also rely on the fastener 44 for compressing the gasket 82 and maintaining the seal. The parallel planes also help ensure an equal distribution of the clamp load about the gasket 82.

The grommet 78 may also include a tapered portion 92 for attaching the vent port 30 to the mounting bracket 68. The tapered portion 92 is formed between the inlet 80 and the flange 88. The tapered portion 92 extends radially outward and beyond the vent aperture 34 for resting upon the mounting bracket 68. The tapered portion 92 is longitudinally spaced from the flange 88 to form a slot 94 therebetween for longitudinally locating the grommet 78 to the mounting bracket 68.

The outlet 38 includes the floorpan aperture 40. The outlet may also include a filter 96 disposed over the floorpan aperture 40. The filter 96 limits the ingress of material into the gas discharge system 26. The type of filter 96 selected depends on the mounting location of the battery assembly 12. In one embodiment, the filter 96 includes a semi-permeable membrane 98. The semi-permeable membrane 98 allows gas to vent from the gas discharge mechanism 26 while limiting ingress of liquid and particles (e.g., rocks) that may splash from underneath the vehicle. Other embodiments of the system 10 include a filter attached to the battery assembly 12 and disposed over the vent aperture (not shown).

Figure 6:
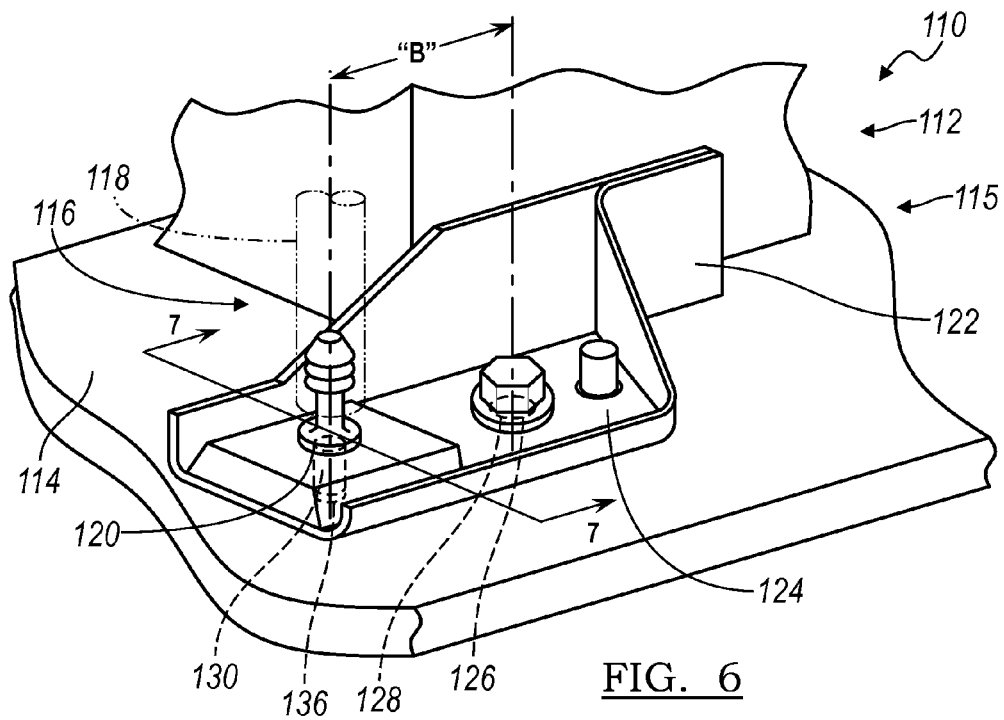
FIG. 6 is an enlarged view of a base of a battery gas discharge system according to another embodiment.
Figure 7:
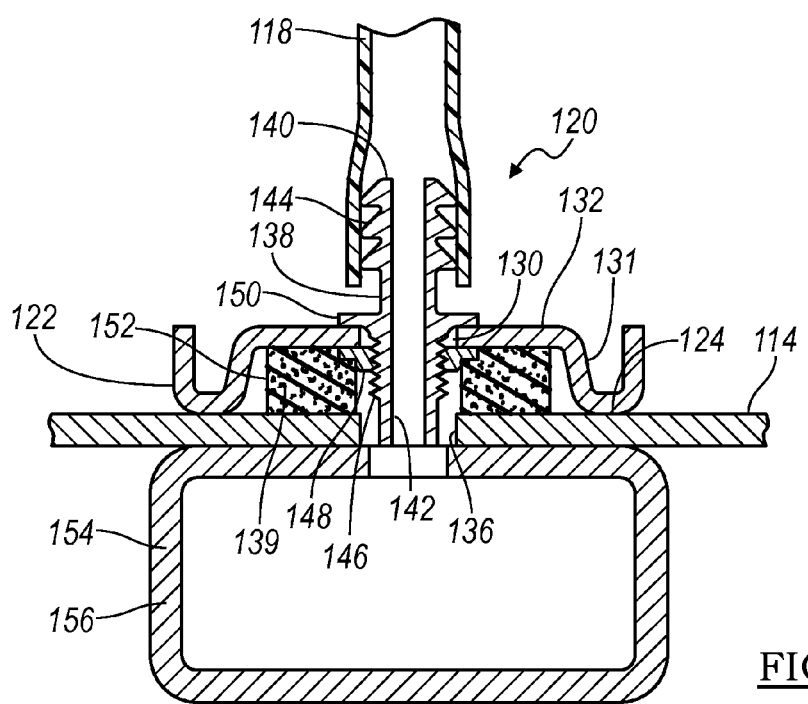
FIG. 7 is a cross-sectional view of the base of FIG. 6 taken along section line 7-7.

Referring to FIGS. 6 and 7, a battery gas discharge system is illustrated in accordance with another embodiment and is generally referenced by numeral 110. The system 110 includes a battery assembly 112 that is mounted to a floorpan 114 of a vehicle (not shown).

The battery assembly 112 includes a base 115 and a gas discharge mechanism 116 for discharging gas from the battery to outside of the vehicle. The gas discharge mechanism 116 includes a vent tube 118 and a vent port 120 that are connected to each other to define a passageway for gas discharge.

The base 115 includes a mounting bracket 122 for attaching to the floorpan 114. The mounting bracket 122 includes a mounting flange 124 in contact with the floorpan 114. An attachment aperture 126 is formed through the mounting flange 124 and aligned with a fastener aperture 128 that is formed through the floorpan 114.

The mounting bracket 122 also includes a vent aperture 130 for locating the vent port 120. A boss 131 projects from the mounting flange 124. The boss 131 forms a raised surface 132 spaced above the floorpan 114. The vent aperture 130 is formed through the raised surface 132 and is aligned with a floorpan aperture 136 that is formed through the floorpan 114.

The lateral spacing between the attachment aperture 126 and the vent aperture 130 corresponds to the lateral spacing between the fastener aperture 128 and the floorpan aperture 136, and is generally referenced by "B". The lateral spacing "B" allows the vent port 120 to simultaneously mate with the floorpan aperture 136 by securing the mounting bracket 122 to the floorpan 114 about attachment aperture 126 and fastener aperture 128. No additional attachments of the gas discharge mechanism 116 are needed.

The vent port 120 includes a fitting 138 and a gasket 139 for coupling the gas discharge mechanism 116 to the floorpan aperture 136. The fitting 138 has a tubular shape and is formed of a rigid material, such as brass or a glass-filled nylon. The fitting 138 includes a first end 140 for receiving discharged gas. The first end 140 extends from the vent aperture 130 and includes a series of projections 144 that extend radially outward for engaging an inner surface of the vent tube 118. The vent tube 118 may be formed of a flexible hose.

The fitting 138 attaches to the mounting bracket 122 about the vent aperture 130. The fitting 138 includes a second end 142 that is longitudinally spaced from the first end and extends through the vent aperture 130. The second end 142 may extend beyond the mounting bracket 68 as illustrated in FIG. 7. In one embodiment the second end 142 terminates within the boss 131 to reduce any potential for damaging the fitting 138 during shipping or assembly.

The second end 142 includes external threads 146 for engaging a nut 148. The fitting 138 includes an intermediate portion 150 formed between the first end 140 and the second end 142. The intermediate portion 150 extends radially outward for resting upon the mounting bracket 122. The fitting 138 attaches to the mounting bracket 122 by clamping the bracket 122 between the intermediate portion 150 and the nut 148.

The gasket 139 engages the floorpan 114 for sealing the vent port 120 to the floorpan 114. The gasket may be formed of a sponge rubber material such as a silicone rubber. The gasket 139 forms a disc 152 that is disposed about the vent aperture 130 and between the mounting bracket 122 and the floorpan 114. The thickness of the gasket 139 is greater than a height of the boss 131. Therefore the mounting bracket 122 compresses the gasket 139 during installation of the battery assembly 112 for forming a seal. Sealing the vent port 120 to the floorpan 114 about the floorpan aperture 136 helps prevent any discharged gas from venting into the vehicle interior.

A filter 154 may be disposed over the floorpan aperture 136 for limiting ingress of material into the gas discharge mechanism 116. The type of filter 154 selected depends on the mounting location of the battery assembly 112. In one embodiment, the filter 154 includes a portion of a rail 156. The rail 156 may be a structural member of the vehicle. The rail 156 does not include any other apertures that are aligned with the floor aperture 136, thereby limiting ingress of water or particles that may splash from underneath the vehicle.

Figure 8:
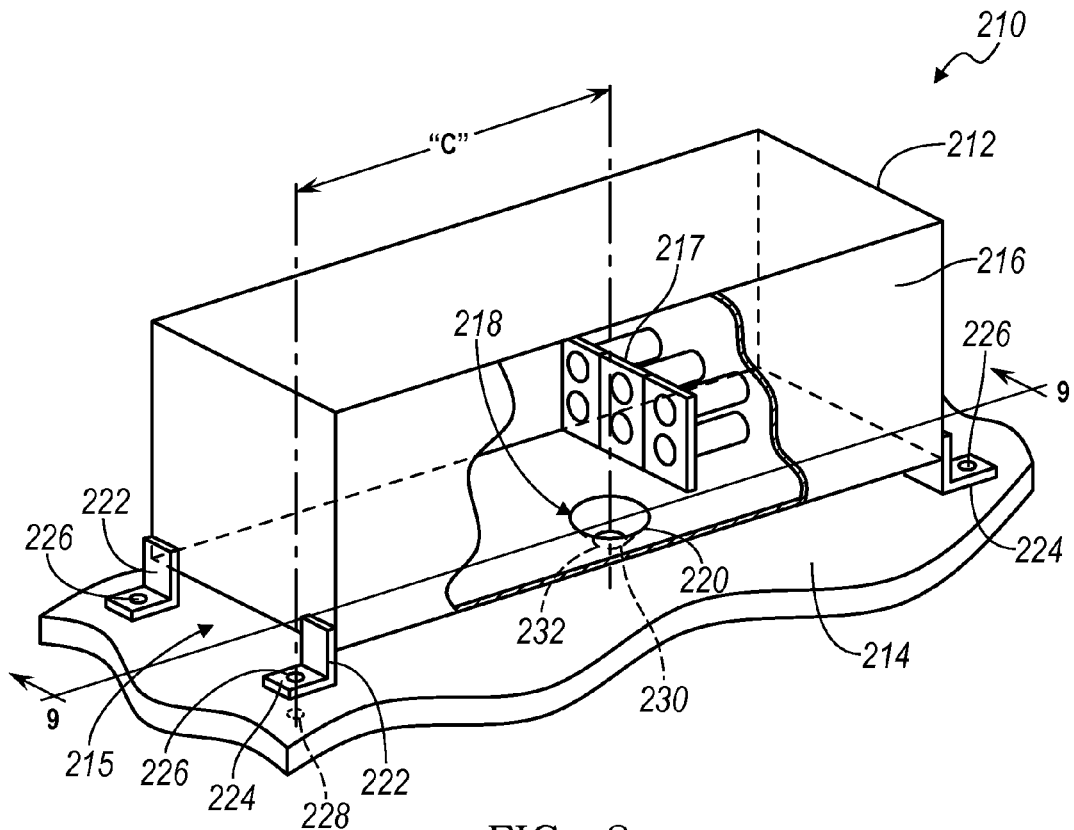
FIG. 8 is a partially fragmented view of a battery gas discharge system according to yet another embodiment.
Figure 9:
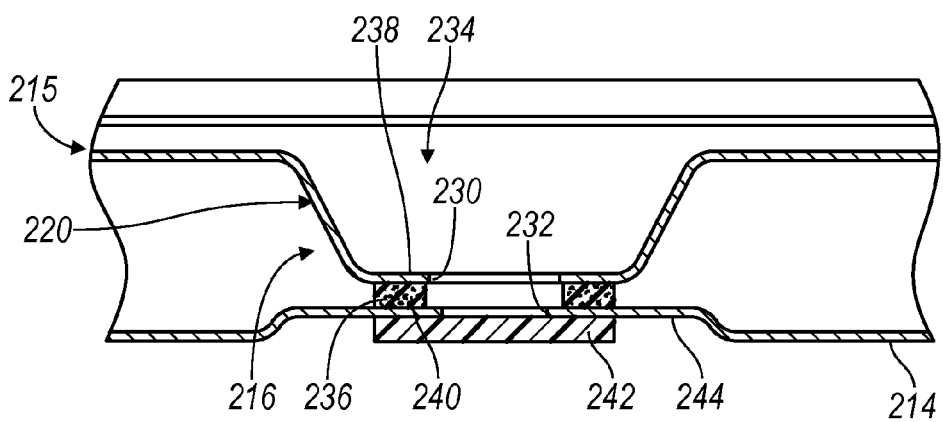
FIG. 9 is a cross-sectional view of the system of FIG. 8 taken along section line 9-9.

With reference to FIGS. 8 and 9, a battery gas discharge system having an internal vent port is illustrated in accordance with an embodiment and is generally referenced by numeral 210. The system 210 includes a battery assembly 212 that is mounted to a floorpan 214 of a vehicle (not shown).

The battery assembly 212 includes a base 215 including mounting structure for rigidly attaching the battery assembly 212 to the floorpan 214. The battery assembly 212 also includes a case 216 that extends from the base 215 to define an enclosed cavity. A plurality of cells 217 are located within the case 216. The cells 217 are adapted to store electrical energy. The cells 217 include electrolytes that should be prevented from leaking or venting into a passenger compartment of the vehicle.

The battery assembly 212 includes a gas discharge mechanism 218 for discharging gas out of the case 216. The gas discharge mechanism 218 includes a vent port 220 that is integrally formed into the base 215 to define a passageway for gas discharge.

The base 215 includes a plurality of mounting brackets 222 for attaching the battery assembly 212 to the floorpan 214. Each mounting bracket 222 includes a mounting flange 224 in contact with the floorpan 214. An attachment aperture 226 is formed through each mounting flange 224 and aligned with a fastener aperture 228 formed through the floorpan 214.

The gas discharge mechanism 218 also includes a vent aperture 230 that is formed through the base 215. The vent port 220 is formed about the vent aperture 230. The vent aperture 230 is co-axially aligned with a floorpan aperture 232 formed in the floorpan 214 for facilitating gas discharge.

The spacing between at least one of the attachment apertures 226 and the vent aperture 230 corresponds to the spacing between at least one of the fastener apertures 228 and the floorpan aperture 232, and is generally referenced by "C". The spacing "C" allows the vent port 220 to simultaneously mate with the floorpan aperture 232 by securing the mounting bracket 222 to the floorpan 214 about the attachment aperture 226 and fastener aperture 228.

The vent port 220 may include a recessed cup 234 and a seal such as a gasket 236. The recessed cup 234 projects from the base 215 towards the floorpan 214. The cup 234 forms a generally frusto-conical shape with a lower surface 238 that is proximate to the floorpan 214. The vent aperture 230 is formed through the lower surface 238. The vent port 220 is adapted for receiving any discharged gas from the battery.

The gasket 236 engages the floorpan 214 for sealing the vent port 220 to the floorpan 214. The gasket 236 is disposed about the vent aperture 230 and between the base 215 and the floorpan 214. The gasket 236 may be formed in a disc shape 240. The gasket 236 may be attached (e.g., adhered) to the base 215. The thickness of the gasket 236 is greater than a spacing between the lower surface 238 of the base 215 and the floorpan 214. Therefore the base 215 compresses the gasket 236 during assembly for sealing the vent port 220 to the floorpan 214.

A filter 242 may be disposed over the floorpan aperture 232 for allowing gas to discharge while limiting ingress of material into the gas discharge mechanism 218. The type of filter 242 selected depends on the location where the battery assembly 212 is mounted in the vehicle. Other embodiments of the system 210 include a filter disposed over the vent aperture 230 and located within the case 216.

In one embodiment, the floorpan 214 includes a floorpan boss 244 localized about the floorpan aperture 232. The floorpan boss 244 projects upwards toward the battery assembly 212, thereby raising the floorpan aperture 232. The floorpan aperture 232 is co-axially aligned with and proximate to the vent aperture 230. By raising the floorpan aperture 232, the vent port 220 can also be raised. Raising the vent port 220 relative to the mounting brackets 222 helps prevent damage to the gasket 236 prior to vehicle assembly (e.g., during shipping).

Other embodiments of the system 210 are contemplated with other configurations of the recessed cup 234 and boss 244, while maintaining the relative proximate orientation of the vent aperture 230 to the floorpan aperture 232. For example, in one embodiment of the system 210, a floorpan boss is provided that projects further upward to eliminate the recessed cup and allows for a vent port that is basically flush with a bottom surface of the case (not shown). In another embodiment of the system 210, the floorpan boss 244 projects further upward, and the vent port forms a boss that extends into the case 216 (not shown).

While the best mode for carrying out the invention has been described in detail, those familiar with the art to which this invention relates will recognize various alternative designs and embodiments for practicing the invention as defined by the following claims. Additionally, the features of various implementing embodiments may be combined to form further embodiments of the invention.

What is claimed:

1. A battery assembly comprising:
    a battery module having a base for resting upon an underlying surface, the base includes an attachment feature and a vent aperture formed through the base, the attachment feature being laterally spaced apart from the vent aperture; and
    a vent port coupled to the vent aperture and defining a passageway for gas discharge through the vent aperture, the vent port including a seal disposed about the vent aperture, the seal being adapted for mating with and forming a seal about an outlet formed in the underlying surface by securing the base to the underlying surface.

2. The battery assembly of claim 1 wherein the attachment feature further comprises an attachment aperture formed through the base and sized for receiving a fastener.

3. The battery assembly of claim 2 wherein the base further comprises a mounting bracket, the mounting bracket provided with:
    a mounting flange for resting upon the underlying surface, wherein the attachment aperture is formed through the mounting flange; and
    a boss projecting from the mounting flange to form a raised surface spaced above the underlying surface, wherein the vent aperture is formed through the raised surface.

4. The battery assembly of claim 3 further comprising a vent tube coupled between the battery module and the vent port for extending the passageway for gas discharge.

5. The battery assembly of claim 4 wherein the vent port further comprises a grommet having a tubular shape and formed of a resilient material, the grommet provided with:
    an inlet forming an inner cavity for receiving a distal end of the vent tube; and
    a tapered portion extending radially outward from an intermediate portion of the grommet;
    wherein the seal further comprises a gasket that is integrally formed with the grommet and extends radially between the raised surface and the underlying surface to form a flange, the flange being longitudinally spaced from the tapered portion to form a slot therebetween for locating the grommet to the mounting bracket.

6. The battery assembly of claim 5 wherein the grommet further comprises at least one annular ring extending transversely from the flange for engaging the underlying surface.

7. The battery assembly of claim 4 wherein the vent port further comprises a fitting having a tubular shape, the fitting provided with:
    a first end having a series of projections extending radially outward for engaging an inner surface of the vent tube;
    a second end opposite the first end and projecting through the vent aperture, the second end having external threads formed therein for receiving a nut; and
    an intermediate portion of the fitting formed between the first end and the second end, the intermediate portion extending radially outward for resting upon the raised surface of the mounting bracket.

8. The battery assembly of claim 1 wherein the vent port further comprises a cup formed in the base, the cup having an offset surface, and wherein the vent aperture is formed through the offset surface.

9. The battery assembly of claim 8 wherein the cup is formed with a frusto-conical shape.

10. The battery assembly of claim 1 wherein the battery module further comprises:
a case extending from the base to define a cavity; and
cells secured within the case for storing electrical energy.

11. A battery gas discharge system for mounting in a vehicle, the system comprising:
a body surface for retaining components within an interior of a vehicle, the body surface having an outlet and a fastener aperture formed through the body surface, the outlet and the fastener aperture being laterally spaced from each other;
a battery module having a base for mounting to the body surface, the base having an attachment aperture and a vent aperture formed through the base, the attachment aperture and the vent aperture being laterally spaced from each other; and
a gas discharge mechanism coupled between the battery module and the vent aperture for defining a passageway for gas discharge, the gas discharge mechanism provided with:
a vent tube having a proximal end projecting into the battery module and a distal end opposite the proximal end, and
a vent port coupled to the vent aperture and sized for receiving the distal end of the vent tube, the vent port including a seal disposed about the vent aperture and adapted for mating with and forming a seal about the outlet by securing the base to the body surface during assembly.

12. The system of claim 11 further comprising at least one locating feature for orienting the battery module to the body surface during assembly.

13. The system of claim 11 wherein the outlet further comprises:
a floorpan aperture formed through the body surface; and
a filter disposed adjacent to the floorpan aperture for limiting ingress of material through the floorpan aperture.

14. The system of claim 13 wherein the filter further comprises a semi-permeable membrane.

15. A battery assembly comprising:
a battery module having a base including a vent aperture formed therethrough and an attachment laterally spaced from the vent aperture; and
a vent port coupled to the vent aperture, including a seal disposed thereabout and adapted for mating with an outlet adjacent the base.

16. The battery assembly of claim 15 wherein the attachment further comprises an attachment aperture formed through the base and sized for receiving a fastener.

17. The battery assembly of claim 16 wherein the base further comprises a mounting bracket, the mounting bracket provided with:
a mounting flange for resting upon an underlying surface, wherein the attachment aperture is formed through the mounting flange; and
a boss projecting from the mounting flange to form a raised surface spaced above the underlying surface, wherein the vent aperture is formed through the raised surface.

18. The battery assembly of claim 15 further comprising a vent tube coupled between the battery module and the vent port providing a passageway for gas discharge.

19. The battery assembly of claim 18 wherein the vent port further comprises a grommet having a tubular shape and formed of a resilient material, the grommet provided with:
an inlet forming an inner cavity for receiving a distal end of the vent tube; and
a tapered portion extending radially outward from an intermediate portion of the grommet.

20. The battery assembly of claim 15 wherein the vent port further comprises a cup formed in the base, the cup having an offset surface, and wherein the vent aperture is formed through the offset surface.

* * * * *